No. 733,740. PATENTED JULY 14, 1903.
J. S. PHILPOTT.
ACETYLENE GAS GENERATOR.
APPLICATION FILED MAR. 25, 1903.
NO MODEL.
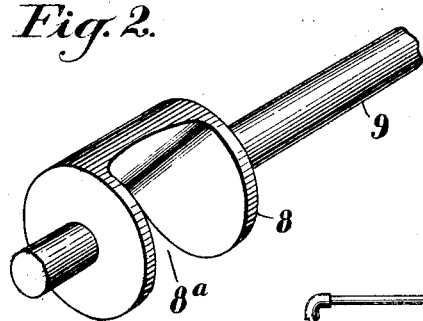
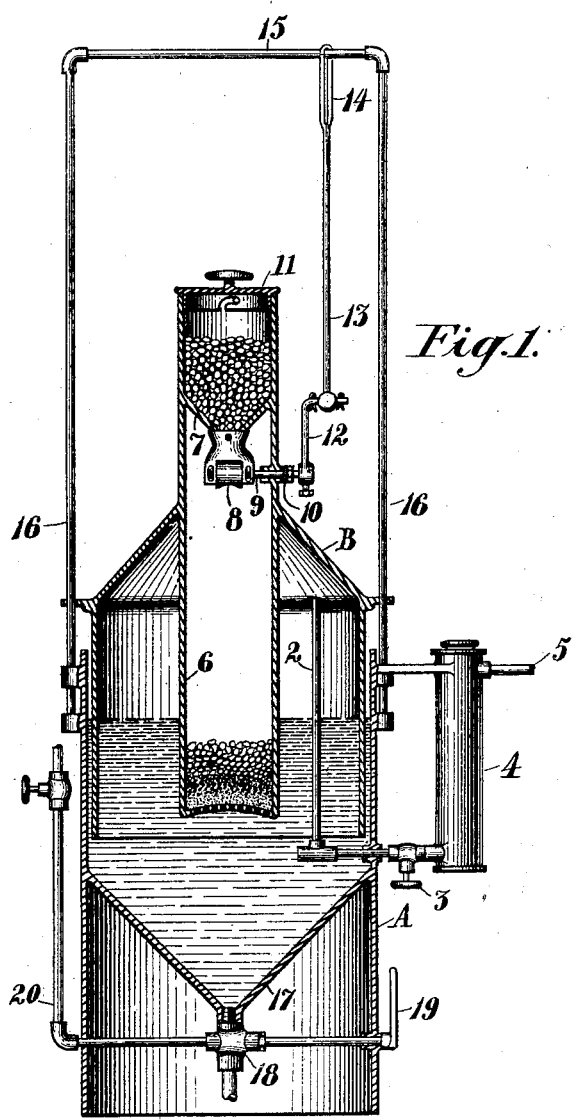
Witnesses:-
Inventor,
James S. Philpott,
By his Attorney,
Geo. H. Strong.

No. 733,740.                                                                                          Patented July 14, 1903.

UNITED STATES PATENT OFFICE.

JAMES S. PHILPOTT, OF WINDSOR, CALIFORNIA, ASSIGNOR OF ONE-HALF TO GEORGE A. NALLEY, OF WINDSOR, CALIFORNIA.

ACETYLENE-GAS GENERATOR.

SPECIFICATION forming part of Letters Patent No. 733,740, dated July 14, 1903.

Application filed March 25, 1903. Serial No. 149,509. (No model.)

*To all whom it may concern:*

Be it known that I, JAMES S. PHILPOTT, a citizen of the United States, residing at Windsor, county of Sonoma, State of California, have invented an Improvement in Acetylene-Gas Apparatus; and I hereby declare the following to be a full, clear, and exact description of the same.

My invention relates to an apparatus for the manufacture and storage of acetylene gas and the means for automatically supplying the calcium carbid when necessary and cutting it off at proper intervals.

It consists of a generator, a rising-and-falling gasometer, a reservoir for the carbid movable in unison with the gasometer, a cut-off device, connections between said cut-off and the rising-and-falling bell and with an exterior stationary point whereby the two operate to actuate the cut-off valve and open it upon the reduction of the supply and descent of the gas-holder and to close it and cut off the supply by the ingress of gas and the rise of the gasometer.

It also comprises details of construction, which will be more fully explained by reference to the accompanying drawings, in which—

Figure 1 is a vertical section. Fig. 2 is a perspective view of the cut-off gate.

It is the object of my invention to provide an automatically-operating apparatus for generating gas from calcium carbid or equivalent compound from which the gas may be produced.

As illustrated in the present drawings, A is the water-tank of the apparatus, and B is a bell or gas-holder having an open bottom fitting in said tank and adapted to contain gas which is generated or delivered thereto. The tank being filled to the proper height with water by any suitable opening or connection, the gas-holder B may be submerged, and when the gas is formed or delivered into the bell it gradually rises, from which the gas is withdrawn through a pipe 2 and controlled by a cock 3, and the gas may be delivered from this pipe into a purifier 4, from which gas may be withdrawn for use through a suitable gas-outlet pipe 5.

The device as here shown is especially designed for the use of calcium carbid, which may be introduced into the water of the tank A, and the action of the water upon the carbid will evolve the gas, which will rise into the gas-holder B and cause it in turn to rise in the water of the tank, as previously described.

In carrying out my invention I have shown a cylindrical or equivalent tube 6, of sufficient diameter for the purpose, fixed in the top and central of the gas-holder B, and this tube extends down to near the bottom of the gas-holder, and it is closed at the bottom to form a chamber into which the carbid may be delivered. In this position the carbid will be acted upon by the water and the gas formed, thus raising the gas-holder, and with it the carbid-holder 6, until the carbid is clear of the water, when gas will cease to be formed. When by use the gas is withdrawn from the holder B, it and the chamber 6 will sink by gravitation until the carbid is again submerged, thus alternately rising and falling and maintaining a sufficient supply of gas until the charge of carbid is exhausted.

My invention is designed to automatically renew the supply of carbid as fast as it is exhausted. It consists of a conically-shaped holder 7, fixed in the extension of the part 6, which rises above the gas-holder B. Above this part 7 may be any suitable reservoir containing the carbid. This part 7 is funnel-shaped, and extending transversely across the lower part of it is a cylindrical gate or valve 8, mounted upon a horizontally-journaled shaft 9, and this shaft extends out through a suitable stuffing-box 10 in the side of the tubular chamber 6, so that there will be no escape of gas at this point. The top of the reservoir may be provided with any suitable hermetically-sealing cover 11, which can be easily removed to charge the upper part of the reservoir and then be secured in place. The cylindrical gate 8 has one side cut away, as shown at $8^a$, so that when turned this side may be brought into line with the discharge of the part 7. When in this position, it provides a free opening or discharge from the reservoir above into the lower part of the carbid-tube 6. When turned, the complete segment or back of the cylindrical gate 8 will extend across the discharge-opening of the funnel 7, and thus prevent any further passage of the carbid. The shape of the cutaway portion 8ª, which is well shown in the drawings, forms a sharp cutting edge at the junction of the opening with the cylindrical portion of 8, and this edge serves to positively cut off any hard portion or fragment of the carbid which might otherwise clog and prevent the gate from turning.

In order to turn the gate automatically, I have shown a crank-arm 12, fixed upon the end of the shaft 9, which projects outside of the chamber 6, and to the end of this crank-arm is loosely connected a rod 13. The upper end of the rod has a link 14, and this link clasps a horizontally-fixed bar 15. The length of the link is such that it may rise and fall a certain distance before its ends strike the bar 15. This bar 15 may be fixed in any suitable or convenient relation above the apparatus. I have here shown it as formed of a tube connected by elbows at the ends with vertical tubes, as 16, and these vertical tubes are fixed to and supported from the tank A.

The operation of the apparatus will then be as follows: When the gas-holder is at its lowest point, the upper curve of the link 14 will rest upon the fixed bar 15, and the length of the link and the rod 13 is such that by its pull upon the crank 12 will turn the shaft 9 and the gate 8 until the latter is in line to allow a charge of carbid to fall into the carbid-chamber 6, and being exposed to the water in the tank gas will immediately commence to form and the gasometer will rise. As the gasometer rises the link 14 will move freely upon the bar 15 until its lower curve contacts with the bar. This prevents any further rise of the link and rod, and as the gas-holder continues to rise under the pressure of the accumulating gas it causes the rod 13 to turn the crank 12 and with it the gate 8, the edge of which thus acts to forcibly cut off the body of carbid which lies within and across the gate, and when the gas-holder has risen sufficiently this action will have turned the gate so far that the cylindrical back portion will stand across the discharge of the funnel 7, and thus cut off any further supply. The movement of the parts is sufficient to allow the rise of the gas-holder to carry the carbid-chamber 6 above the surface of the water in the tank, and thus arrest any further production of gas until by use the quantity in the holder has been so reduced that the holder again sinks and allows the carbid to be submerged. This action will take place without opening the gate 8 on account of the length of the link 14; but when the carbid charge in the holder 6 has been exhausted the gas-holder will continue to sink, and the pull upon the rod 13 and the crank 12 will then turn the gate sufficiently to open it and allow a further charge of carbid to be delivered into the holder 6.

The lower part of the tank A is preferably made with a conical bottom, as at 17, and at the apex of the cone is fixed a draw-off cock 18, which may be operated by the lever or crank, as at 19, or by other suitable means, and opened to discharge the waste material, which will accumulate in the bottom of the chamber. Water may be supplied through a branch pipe, as at 20, to loosen and wash out this residue from time to time.

Having thus described my invention, what I claim, and desire to secure by Letters Patent, is—

1. An acetylene-gas apparatus consisting of a water-tank, a gas-holder adapted to rise and fall therein, a carbid submerger and reservoir extending through the top of the gas-holder and movable therewith, a gate and cut-off located between the reservoir and the lower part of the carbid-submerger and connections including a crank fixed to the gate, a fixed stop or bar and a rod extending from the crank and having its outer end engaging and adapted to move a limited distance relative to the stop or bar, by which said gate is closed and opened automatically by the rising and falling of the gas-holder.

2. An acetylene-gas apparatus consisting of a water-tank, a gas-holder adapted to rise and fall within the tank, a tubular chamber fixed and extending vertically through the top of the gas-holder, the lower part of said chamber being adapted to contain and submerge the carbid, a carbid-reservoir formed in the upper part exterior to the gasometer, a contracted discharge-passage from the reservoir to the lower part of the tube, a gate by which said passage is controlled, an arm extending outwardly through the side of the chamber having a crank fixed thereto, a rod connected with the crank and having its upper end adapted to slide a limited distance with relation to a fixed bar or stop whereby the rise and fall of the gas-holder actuates the cut-off valve.

3. An acetylene-gas machine consisting of a water-tank, a gas-holder adapted to rise and fall therein having a vertical tubular chamber extending through the top and adapted to contain carbid in the lower part and to submerge it in the water of the tank and the supply-reservoir in the upper part, a contracted passage between the reservoir and the interior of the chamber, a horizontally-turnable cylindrical gate having one side cut away to register with the discharge-passage, and an edge formed thereon whereby the turning of the gate acts to cut off the hard carbid and close the passage, and means including a fixed stop or bar, a crank-shaft extending from the gate and a connection from the crank-shaft to the stop or bar and having a limited movement relative to the latter whereby the gate is automatically actuated.

4. An acetylene-gas machine consisting of a water-tank, a gasometer adapted to rise and fall therein, a vertical tubular chamber carried by the gas-holder, the lower part adapted to contain carbid and submerge it within the water-tank, the upper part forming a carbid-reservoir, a contracted opening between the reservoir and the interior of the chamber, a transversely-journaled cylindrical gate adapted to close the passage having one side cut away to register with the passage when sufficiently turned, an edge formed at the junction of said cut-away portion to act as a cutter for the mass of carbid, an exterior crank connection with the gate-shaft, connections between said crank and a fixed bar and having a limited movement relative to the latter, whereby the rise and fall of the gas-holder acts in conjunction with the fixed bar to forcibly turn the gate and open or close the carbid-passage.

5. An acetylene-gas machine consisting of a water-tank, a gas-holder adapted to rise and fall therein, a carbid supply and submerging chamber carried by the gas-holder, a transversely-revoluble cylindrical gate having a cut-away portion to register with the passage from the carbid-reservoir, a crank fixed to the exterior end of the gate-shaft, a rod having one end connected with the crank and an open link or slot at the other end, a fixed pin or bar upon which said slot is slidable whereby the gas-holder is allowed to rise and fall within the limit of the length of the slot and the contact of either end of the slot with the fixed bar acts in conjunction with the rising or falling gasometer to forcibly close or open the gate.

In witness whereof I have hereunto set my hand.

JAMES S. PHILPOTT.

Witnesses:
 LOUIS LEHN,
 W. C. LINDSAY.